United States Patent
Lemanski et al.

(10) Patent No.: US 6,499,558 B2
(45) Date of Patent: Dec. 31, 2002

(54) MODULAR MOTOR AND CONTROLLER ASSEMBLY FOR REAR-WHEEL STEERING SYSTEM

(75) Inventors: Brian Lemanski, Linwood, MI (US); Gordon D Richardson, Midland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/860,148

(22) Filed: May 17, 2001

(65) Prior Publication Data

US 2002/0170770 A1 Nov. 21, 2002

(51) Int. Cl.$^7$ ................................................. B62D 5/04
(52) U.S. Cl. ....................... 180/445; 180/413; 310/67 R
(58) Field of Search ................................ 180/443, 446, 180/444, 408, 412, 413, 445; 280/99, 100, 91.1; 310/67 R

(56) References Cited

U.S. PATENT DOCUMENTS

| 3,809,935 | A | * | 5/1974 | Kristen et al. ................. 310/68 |
|---|---|---|---|---|
| 4,796,904 | A | * | 1/1989 | Kubo et al. ..................... 280/91 |
| 4,828,062 | A | * | 5/1989 | Shimizu ....................... 180/140 |
| 4,896,737 | A | | 1/1990 | Kanazawa et al. |
| 4,953,648 | A | * | 9/1990 | Ohmura ........................ 180/79.1 |
| 4,986,381 | A | * | 1/1991 | Morishita et al. ........... 180/79.1 |
| 5,145,022 | A | * | 9/1992 | Kido ............................ 180/79.1 |
| 5,159,218 | A | * | 10/1992 | Murry et al. .................. 310/68 B |
| 5,245,258 | A | | 9/1993 | Becker et al. |
| 5,295,550 | A | | 3/1994 | Chikuma |
| 5,327,064 | A | * | 7/1994 | Arakawa et al. ............. 318/801 |
| 5,408,154 | A | * | 4/1995 | Meiser et al. ................. 310/71 |
| 5,532,533 | A | * | 7/1996 | Mizutani ...................... 310/68 B |
| 5,737,188 | A | | 4/1998 | Flierl et al. |
| 5,836,419 | A | * | 11/1998 | Shimizu et al. ............. 180/443 |
| 5,895,207 | A | | 4/1999 | Burgdorf et al. |
| 5,912,541 | A | * | 6/1999 | Bigler et al. ................. 318/600 |
| 6,099,325 | A | | 8/2000 | Parkhill |

FOREIGN PATENT DOCUMENTS

| DE | 32 23 624 A1 | 6/1982 |
|---|---|---|
| SU | 1298124 A1 | 3/1987 |
| WO | WO 93/08617 | 4/1993 |

* cited by examiner

Primary Examiner—Avraham Lerner
(74) Attorney, Agent, or Firm—Edmund P. Anderson

(57) ABSTRACT

A modular motor and controller assembly for a rear steering system of a motor vehicle includes a motor portion and a controller portion disposed in direct mechanical communication therewith to form a unitary package. The motor portion may include a motor and a motor port, the motor port being configured to provide a communicational interface between the motor and the controller portion. The controller portion may include a controller port configured to be matingly engaged with the motor port. Electronic communication is generally maintained through the controller port and the motor port through a pronged connector.

22 Claims, 2 Drawing Sheets

MODULAR MOTOR AND CONTROLLER ASSEMBLY FOR REAR-WHEEL STEERING SYSTEM

BACKGROUND

In steering systems for motor vehicles in which the rear wheels are steerable, a motor is mounted to the rear axle to angle the rear wheels to steer the motor vehicle. The motor is controllably operated as a result of input signals received from a controller that is remotely located from the rear axle. In such a configuration, a wiring harness is used to provide electronic communication between the controller and the motor.

One particular arrangement for a steering system for a motor vehicle having rear steering includes a motor mounted on the rear axle of the motor vehicle and a controller mounted on the motor vehicle frame. A wiring harness extends between the axle-mounted motor and the frame-mounted controller. Such a harness generally comprises large gage wire that is specially manufactured to possess high flexibility characteristics. A harness overmold assembly, a braided shield, various seals, and a flexible conduit are disposed over the wire. Because each different model of motor vehicle has a slightly different configuration (e.g., different mounting locations for the motor and the controller), a different wiring harness is generally required for each different model.

Furthermore, when incorporated into the rear wheel steering system of a motor vehicle, the wiring harness is oftentimes exposed to adverse and extreme environmental conditions. The harness overmold assembly, the braided shield, and the flexible conduit in which the wires of the wiring harness are disposed may provide only limited protection to the integrity of the electronic communication between the motor and the controller when subjected to high concentrations of road salt, large variations in humidity, and large variations in temperature. Exposure to such environments may degrade the integrity of the wiring harness over time, thereby necessitating the repair or replacement of the wiring harness.

SUMMARY

A modular motor and controller assembly for a rear steering system of a motor vehicle is disclosed herein. The modular motor and controller assembly integrates the motor and the controller into a single unit, thereby eliminating the need for a wiring harness extending therebetween. Without such a wiring harness, a lower electrical resistance, which translates into a more effective current transmission, can be realized between the motor and the controller. Moreover, the modular aspect of the assembly allows it to be "drop-mounted" directly into the rear axle assembly, which eliminates the need for the separate mounting of individual components.

The modular assembly includes a motor portion and a controller portion disposed in direct mechanical communication therewith to form a unitary package. The motor portion may include a motor and a motor port, the motor port being configured to provide a communicational interface between the motor and the controller portion. The controller portion may include a controller port configured to be matingly engaged with the motor port. Electronic communication is generally maintained through the controller port and the motor port through a pronged connector.

DETAILED DESCRIPTION

A modular motor/controller assembly for a motor vehicle having rear steerable wheels forms a self-contained sealed unit that is mountable to the rear axle of the motor vehicle. Such an assembly provides an integral package that eliminates the use of wire harnesses between a drive motor and a controller. The simplistic design of the assembly also allows for its easy removal from the motor vehicle while further allowing for easy disassembly of the motor from the controller, thereby facilitating maintenance and the replacement of parts.

Figure 1:
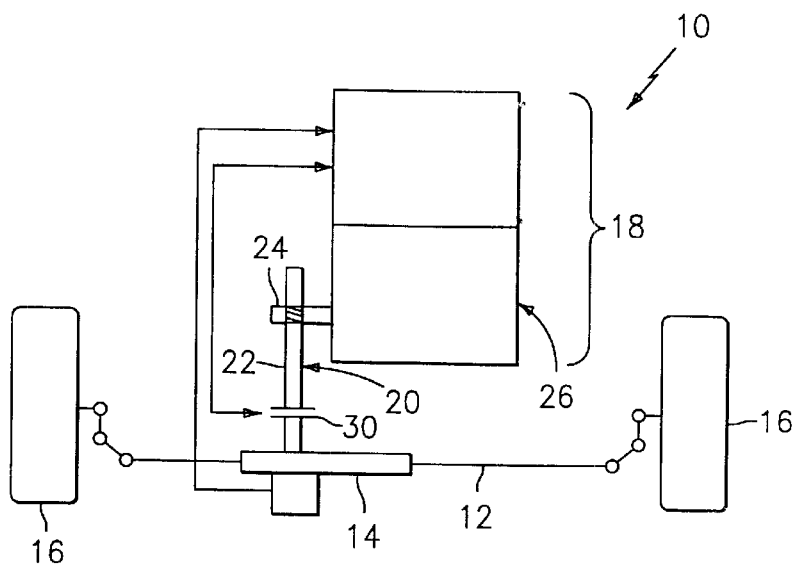
FIG. 1 is a schematic represenation of a motor vehicle having rear steerable wheels controllable by a modular motor/controller assembly.

Referring to FIG. 1, a rear axle steering assembly is shown generally at 10. Rear axle steering assembly 10 allows the rear steerable wheels (in conjunction with the front steerable wheels) to be angled to effectuate a change in direction of the motor vehicle. Rear axle steering assembly 10 comprises a rack shaft 12 having a rack 14 disposed thereon, a pair of rear steerable wheels 16 rotatably disposed on opposing ends of rack shaft 12, and the motor/controller assembly, shown generally at 18. Motor/controller assembly 18 is disposed in operable communication with rack shaft 12 through a drive mechanism, shown generally at 20. Drive mechanism 20 comprises a drive shaft 22 that provides mechanical communication between a rotor shaft 24 of a motor (not shown) of a motor portion, shown generally at 26, of motor/controller assembly 18 and a pinion 28 engaged with rack 14 through a clutch mechanism 30. The rotational motion of rotor shaft 24 is transferred into a lateral motion of rack shaft 12 to effectuate a change in the position of rear steerable wheels 16, thereby contributing to the steerability of the motor vehicle.

Figure 2:
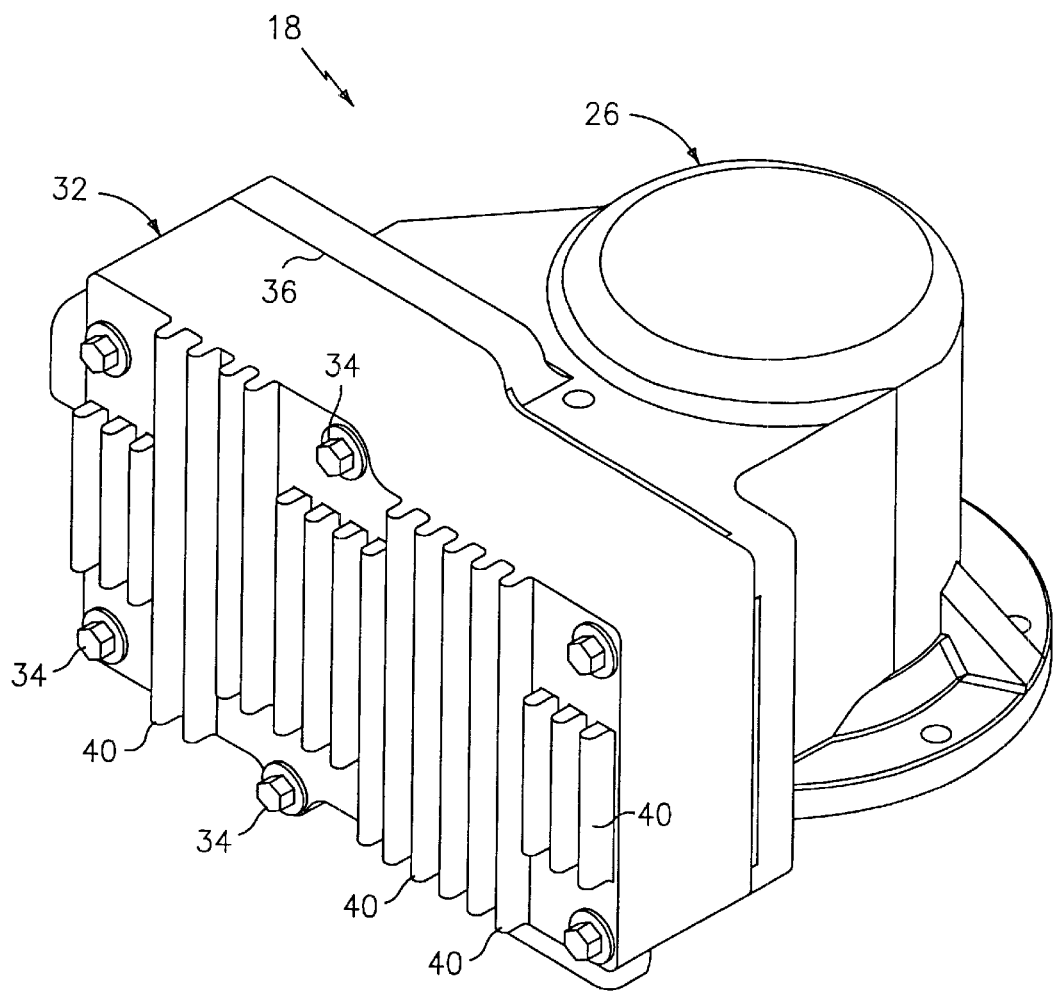
FIG. 2 is a perspective view of a modular motor/controller assembly.

Referring now to FIG. 2, motor/controller assembly 18 is shown and is hereinafter referred to as "assembly 18." Assembly 18 receives control signals from and transmits feedback information to a main control unit (not shown) of the motor vehicle. Assembly 18 comprises motor portion 26 and a controller portion, shown generally at 32, each portion 26, 32 being disposed such that direct physical communication is maintained therebetween. Controller portion 32 is fastened to motor portion 26 utilizing a fastening device 34, which may be a bolt. An interface 36 defined by the mating edges of motor portion 26 and controller portion 32 generally includes a gasket (not shown) that forms a seal, thereby preventing moisture and particulate matter from entering into assembly 18.

Controller portion 32 comprises a control device (not shown) that includes electronic componentry (not shown) configured to control the rotation of the rotor shaft of the motor. A port 38 is disposed on controller portion 32 to enable electronic communication to be maintained between the electronic componentry and a main control system (not shown) of the motor vehicle. Fins 40 disposed on a major surface of a housing of controller portion 32 provide for the dissipation of heat generated during the operation of assembly 18.

Motor portion 26 includes a motor (not shown) disposed therein. The motor, as is described above, is in mechanical communication with the drive mechanism through the rotor shaft. Holes 44 disposed in a lip circumventing an edge of an outer surface of a housing in which the motor is disposed facilitate the mounting of assembly 18 to the rear axle of the motor vehicle.

Figure 3:
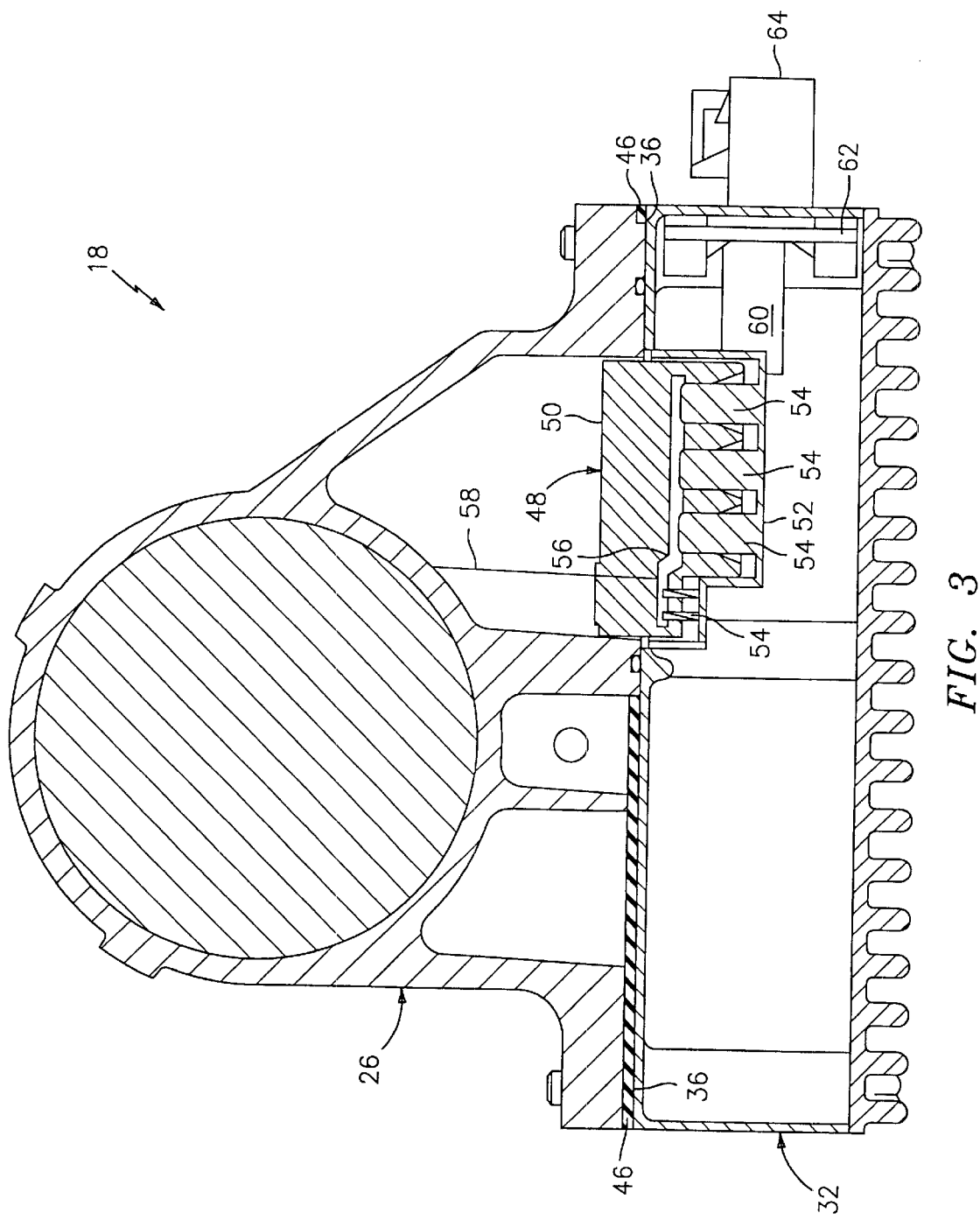
FIG. 3 is a cross sectional view of a modular motor/controller assembly illustrating the electrical connection between the motor and the controller.

In FIG. 3, the engagement of controller portion 32 and motor portion 26 is shown in a cross sectional view of assembly 18. A gasket 46 is disposed at interface 36 of controller portion 32 and motor portion 26 to form the preventive seal. Electronic communication between controller portion 32 and motor portion 26 is maintained with a connector, shown generally at 48. Connector 48 includes prongs 54 and receptacles into which prongs 54 are received, thereby effectuating the interengagement of a motor port 50 and a controller port 52.

Motor port 50 is mounted in motor portion 26 such that access can be gained thereto upon the removal of controller portion 32 from motor portion 26, thereby exposing motor port 50. Motor port 50 is fabricated of a non-conductive material configured to define the receptacles into which prongs 54 of controller port 52 are received and frictionally retained. An electrical connector 56 is disposed within motor port 50 to provide electronic communication between the receptacles and the motor. A motor lead 58 provides electronic communication between electrical connector 56 and the motor. The receptacles and electrical connectors 56 may be configured in a myriad of different arrangements to receive prongs 54.

Controller port 52 is mounted in controller portion 32 and is fabricated of a non-conductive material. Controller port 52 comprises a number of prongs 54 that corresponds with the number of receptacles in motor port 50 extending through the non-conductive material. Prongs 54 are in electronic communication with each other and with a connector lead bus bar 60. Although prongs 54 are shown and described as depending from controller port 52 and being received in the receptacles in motor port 50, the connector may be configured to includes the prongs depending from the motor port and being received in receptacles in the controller port. Connector lead bus bar 60 is in electronic communication with electronic componentry (not shown) disposed on a circuit board 62 within controller portion 32. Circuit board 62 is in electronic communication with the main control unit of the motor vehicle through a connection port 64.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A motor/controller assembly for a motor vehicle, comprising:
    a motor portion; and
    a controller portion disposed in direct mechanical communication with said motor portion, said controller portion being configured to provide electronic communication to said motor portion, said motor portion in operable communication with a rear axle steering assembly of the motor vehicle, said motor portion includes a motor and a motor port; said motor port being configured to provide a communicational interface between said motor and said controller portion,
    wherein said motor includes a rotor shaft, said rotor shaft being exposed at only one end of said motor and adapted to provide mechanical communication with a drive mechanism depending from said rear steering axle assembly.

2. The motor/controller assembly of claim 1 wherein said controller portion comprises: a controller port, said controller port being configured to be matingly engages with said motor port and being configured to enable electronic communication to be between said motor port and a main control unit of the motor vehicle.

3. The motor/controller assembly of claim 2 wherein said electronic communication maintained through said controller port and said motor port is through a pronged connector.

4. The motor/controller assembly of claim 3 wherein said pronged connector includes a prong extending from said controller port, said prong being configured, dimensioned, and positioned to be received in a receptacle of said motor port.

5. The motor/controller assembly of claim 1 wherein a gasket is disposed at an interface between said motor portion and said controller portion.

6. The motor/controller assembly of claim 1 wherein said motor portion is in mechanical communication with the rear axle steering assembly through a drive shaft.

7. The motor/controller assembly of claim 6 wherein said drive shaft includes a clutch mechanism.

8. The motor/controller assembly of claim 1 wherein said motor portion is not axially aligned with said controller portion.

9. The motor/controller assembly of claim 1 wherein said controller portion includes fins depending therefrom.

10. A steering assembly for a motor vehicle, comprising:
    two steerable wheels for operably steering the motor vehicle;
    a rack shaft in mechanical communication with said steerable wheels;
    a motor/controller assembly, said motor/controller assembly including;
        a motor portion, said motor portion having a rotor shaft in operable communication with said rack shaft, rotation of rotor shaft laterally translates said rack shaft to effectuate a change in position of said steerable wheels; and
        a controller portion disposed in direct mechanical communication with said motor portion, said controller portion being configured to provide electronic communication to said motor portion, said motor portion in mechanical communication with a rear axle steering assembly of the motor vehicle through said rotor shaft.

11. The steering assembly of claim 10 wherein said motor portion comprises:
    a motor; and
    a motor port, said motor port being configured to provide a communicational interface between said motor and said controller portion.

12. The steering assembly of claim 11 wherein said controller portion comprises: a controller port, said controller port being configured to be matingly engaged with said motor port and being configured to enable electronic communication to be maintained between said motor port and a main control unit of the motor vehicle.

13. The steering assembly of claim 12 wherein said electronic communication maintained through said controller port and said motor port is through a pronged connector.

14. The steering assembly of claim 13 wherein said pronged connector includes a prong extending from said controller port, said prong being configured, dimensioned, and positioned to be received in a receptacle of said motor port.

15. The steering assembly of claim 11 wherein said motor includes a rotor shaft, said rotor shaft being exposed at only one end of said motor and adapted to provide mechanical communication with a drive mechanism depending from said rear steering axle assembly.

16. The steering assembly of claim 10 wherein a gasket is disposed at an interface between said motor portion and said controller portion.

17. The steering assembly of claim 10 wherein said motor portion is in mechanical communication with the rear axle steering assembly through a drive shaft.

18. The steering assembly of claim 17 wherein said drive shaft includes a clutch mechanism.

19. The steering assembly of claim 10 wherein said motor portion is not axially aligned with said controller portion.

20. The steering assembly of claim 10 wherein said controller portion includes fins depending therefrom.

21. The steering assembly of claim 10 wherein said two steerable wheels are rear wheels for effectuating rear wheel steering of the motor vehicle.

22. The steering assembly of claim 10 wherein said controller portion is in electrical communication with a control unit remote from said motor/controller assembly.

* * * * *